United States Patent
Zhao et al.

(10) Patent No.: US 10,396,591 B2
(45) Date of Patent: Aug. 27, 2019

(54) STANDBY CONTROL CIRCUIT AND OPERATING METHOD THEREOF, PLAYING APPARATUS

(71) Applicant: BOE TECHNOLOGY GROUP CO., LTD., Beijing (CN)

(72) Inventors: Tianyue Zhao, Beijing (CN); Masakazu Okamura, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 15/540,100

(22) PCT Filed: Jul. 1, 2016

(86) PCT No.: PCT/CN2016/088072
§ 371 (c)(1),
(2) Date: Jun. 27, 2017

(87) PCT Pub. No.: WO2017/161730
PCT Pub. Date: Sep. 28, 2017

(65) Prior Publication Data
US 2018/0048180 A1 Feb. 15, 2018

(30) Foreign Application Priority Data

Mar. 23, 2016 (CN) .......................... 2016 1 0170186

(51) Int. Cl.
*H02J 9/00* (2006.01)
*H02J 9/06* (2006.01)
(Continued)

(52) U.S. Cl.
CPC .............. *H02J 9/005* (2013.01); *G06F 1/263* (2013.01); *G06F 1/3203* (2013.01); *H02J 9/061* (2013.01);
(Continued)

(58) Field of Classification Search
CPC ........ H02J 9/005; G06F 1/263; G06F 1/3203; H02L 9/061; H04N 5/63
See application file for complete search history.

(56) References Cited

U.S. PATENT DOCUMENTS 6,812,920 B1 * 11/2004 Otsuka .................. G06F 1/3215
345/211
6,900,849 B1 * 5/2005 Friedreich ............... H02J 9/005
307/31
(Continued)

FOREIGN PATENT DOCUMENTS

| CN | 101447120 A | 6/2009 |
| CN | 101630148 A | 1/2010 |

(Continued)

OTHER PUBLICATIONS

International search report dated Dec. 15, 2016 for corresponding PCT application PCT/CN2016/088072 with English translation attached.
(Continued)

*Primary Examiner* — Brian P Yenke
(74) *Attorney, Agent, or Firm* — Nath, Goldberg & Meyer; Joshua B. Goldberg; Daniel Bissing

(57) ABSTRACT

The present disclosure discloses a standby control circuit and an operating method thereof, and a playing apparatus. The standby control circuit includes a controller and a standby power supply, the controller is configured to transmit a power-on signal to enable the playing apparatus to enter into a power-on state, the controller is further configured to transmit a standby signal to enable the playing apparatus to enter into a standby state, and the standby power supply is configured to supply power to a micro control unit of the playing apparatus under the condition that the playing apparatus is in the power-on state and stop
(Continued)

supplying power to the micro control unit of the playing apparatus under the condition that the playing apparatus is in the standby state.

5 Claims, 2 Drawing Sheets

(51) Int. Cl.
| | |
|---|---|
| H04N 5/63 | (2006.01) |
| H04N 21/443 | (2011.01) |
| G06F 1/26 | (2006.01) |
| G06F 1/3203 | (2019.01) |
| H02J 50/00 | (2016.01) |

(52) U.S. Cl.
CPC ............... *H02J 50/00* (2016.02); *H04N 5/63* (2013.01); *H04N 21/4436* (2013.01)

(56) References Cited

U.S. PATENT DOCUMENTS

| | | | | |
|---|---|---|---|---|
| 6,947,035 | B1* | 9/2005 | Shiraga | G06F 1/1616 345/211 |
| 7,050,049 | B2* | 5/2006 | Byun | G09G 5/003 345/211 |
| 7,126,647 | B2* | 10/2006 | Cha | H02M 1/15 348/730 |
| 7,139,017 | B2* | 11/2006 | Ali | H04N 5/63 348/192 |
| 7,328,357 | B2* | 2/2008 | Terai | G11B 19/00 363/21.01 |
| 7,561,237 | B2* | 7/2009 | Lee | G02F 1/134363 349/129 |
| 7,765,416 | B2* | 7/2010 | Zhou | H02J 9/005 713/300 |
| 7,768,579 | B2* | 8/2010 | Huang | H04N 5/63 348/705 |
| 8,345,035 | B2* | 1/2013 | Li | G09G 5/00 345/212 |
| 8,358,364 | B2* | 1/2013 | Saito | G08C 17/00 348/333.13 |
| 8,358,634 | B1* | 1/2013 | Shetty | H04W 68/02 370/331 |
| 8,405,783 | B2* | 3/2013 | Taya | G08C 17/00 348/730 |
| 8,411,076 | B2* | 4/2013 | Berkay | H02M 3/145 345/211 |
| 8,450,880 | B2* | 5/2013 | Narita | H04N 5/63 307/116 |
| 8,482,677 | B2* | 7/2013 | Deshpande | H04N 5/63 320/111 |
| 8,508,072 | B2* | 8/2013 | Hung | H04N 21/44231 307/64 |
| 8,654,263 | B2* | 2/2014 | Chang | H04N 5/63 |
| 8,898,486 | B2* | 11/2014 | Kang | G06F 1/26 713/300 |
| 9,293,034 | B2* | 3/2016 | Lin | G08C 17/02 |
| 9,462,212 | B2* | 10/2016 | Seo | H04N 5/63 |
| 9,608,469 | B2* | 3/2017 | Yang | H02J 7/025 |
| 2006/0119742 | A1* | 6/2006 | Park | G06F 1/3203 348/730 |
| 2007/0013816 | A1* | 1/2007 | Martin | H04N 5/63 348/730 |
| 2007/0046833 | A1* | 3/2007 | Kitamura | H04N 5/44543 348/730 |
| 2007/0109450 | A1* | 5/2007 | Lee | H04W 76/10 348/730 |
| 2007/0159559 | A1* | 7/2007 | Tai | H04N 5/63 348/748 |
| 2008/0030624 | A1* | 2/2008 | Chang | H04N 5/63 348/730 |
| 2010/0141848 | A1* | 6/2010 | Bastable | H04N 5/63 348/730 |
| 2010/0245678 | A1* | 9/2010 | Hill-Jowett | H04N 5/63 348/730 |
| 2011/0001887 | A1 | 1/2011 | Shintani et al. | |
| 2011/0006611 | A1 | 1/2011 | Baarman et al. | |
| 2011/0295439 | A1* | 12/2011 | Saito | G08C 17/00 700/295 |
| 2012/0086867 | A1* | 4/2012 | Kesler | H03H 7/40 348/730 |
| 2012/0091799 | A1* | 4/2012 | Rofougaran | H02J 1/10 307/24 |
| 2012/0133843 | A1* | 5/2012 | Sakamoto | H04N 21/4104 348/734 |
| 2012/0201062 | A1* | 8/2012 | Lee | H02J 9/005 363/84 |
| 2012/0326502 | A1 | 12/2012 | Nguyen et al. | |
| 2013/0080099 | A1 | 3/2013 | Akada | |
| 2013/0120343 | A1* | 5/2013 | Ahn | G09G 1/005 345/211 |
| 2014/0125872 | A1* | 5/2014 | Chang | H04N 5/63 348/730 |
| 2014/0159655 | A1* | 6/2014 | Kim | H02J 7/025 320/108 |
| 2014/0191854 | A1* | 7/2014 | Lin | G08C 17/02 340/12.22 |
| 2016/0146492 | A1 | 5/2016 | Tomomatsu | |
| 2016/0359358 | A1* | 12/2016 | Jeong | H02J 9/005 |
| 2016/0373167 | A1* | 12/2016 | Nishioka | H04B 7/0695 |
| 2017/0054328 | A1* | 2/2017 | Jung | H02J 50/80 |
| 2017/0171612 | A1* | 6/2017 | Liu | H04N 21/4436 |
| 2017/0278658 | A1* | 9/2017 | Kang | H01H 47/00 |

FOREIGN PATENT DOCUMENTS

| | | |
|---|---|---|
| CN | 102429807 A | 5/2012 |
| CN | 102474575 A | 5/2012 |
| CN | 102934213 A | 2/2013 |
| CN | 103023129 A | 4/2013 |
| CN | 103246208 A | 8/2013 |
| CN | 103592869 A | 2/2014 |
| CN | 104092313 A | 10/2014 |
| CN | 104238421 A | 12/2014 |
| CN | 204031319 U | 12/2014 |
| CN | 105721802 A | 6/2016 |
| WO | 2015/071958 A1 | 5/2015 |

OTHER PUBLICATIONS

Office Action dated Mar. 26, 2018 issued in corresponding Chinese Application No. 201610170186.4.
Second Office Action dated Dec. 3, 2018 corresponding to Chinese application No. 201610170186.4.

* cited by examiner

STANDBY CONTROL CIRCUIT AND OPERATING METHOD THEREOF, PLAYING APPARATUS

This is a National Phase Application filed under 35 U.S.C. 371 as a national stage of PCT/CN2016/088072, filed Jul. 1, 2016, an application claiming the benefit of Chinese Application No. 201610170186.4, filed Mar. 23, 2016, the content of each of which is hereby incorporated by reference in its entirety.

FIELD OF THE INVENTION

The present disclosure relates to the field of television, and particularly relates to a standby control circuit and an operating method thereof, and a playing apparatus.

BACKGROUND

An operating principle of a power supply system of an existing television (TV) set is as follows: an external power supply directly supplies electricity to a standby power-supply circuit, a remote controller transmits a control signal such as a "Power ON" signal, a "Power OFF" signal or the like to the TV set, and the TV set controls the startup or shutdown of a main power supply according to the control signal. Thus, the standby power-supply circuit is always in an operating state, and an operating power of the standby power-supply circuit in the operating state is generally in the range of 0.1 W to 0.5 W. A long accumulation of the aforementioned power will lead to a tremendous waste of energy.

SUMMARY

The present disclosure provides a standby control circuit for a playing apparatus, and the standby control circuit includes a controller and a standby power supply;

the controller is configured to transmit a power-on signal so as to enable the playing apparatus to enter into a power-on state;

the controller is further configured to transmit a standby signal so as to enable the playing apparatus to enter into a standby state; and the standby power supply is configured to supply power to a micro control unit under the condition that the playing apparatus is in the power-on state and stop supplying power to the micro control unit under the condition that the playing apparatus is in the standby state.

Optionally, the controller is further configured to supply power to the standby power supply under the condition that the playing apparatus is in the power-on state and stop supplying power to the standby power supply under the condition that the playing apparatus is in the standby state.

Optionally, the controller is further configured to supply power to the standby power supply by wireless transmission under the condition that the playing apparatus is in the power-on state.

Optionally, the controller includes a first wireless power supplying unit, and the standby power supply includes a first wireless power receiving unit; and the first wireless power supplying unit is configured to supply power to the first wireless power receiving unit by wireless transmission under the condition that the playing apparatus is in the power-on state.

Optionally, the controller further includes a second wireless power receiving unit and a rechargeable battery;

the second wireless power receiving unit is configured to receive electric energy supplied by an external second wireless power supplying unit; and the rechargeable battery is configured to store the electric energy received by the second wireless power receiving unit.

The present disclosure further provides a playing apparatus, which includes a micro control unit and any one of the aforementioned standby control circuits, wherein the micro control unit is connected to the standby power supply; and the micro control unit is configured to control the playing apparatus according to a control signal transmitted by the controller.

Optionally, the playing apparatus further includes a main power supply circuit, which is connected to the micro control unit; and the main power supply circuit is configured to turn on or turn off a main power supply for supplying power to the playing apparatus, under the control of the micro control unit.

Optionally, the main power supply circuit includes a relay switching control unit, a relay and the main power supply, the relay switching control unit is connected with the micro control unit and the relay, respectively, the relay is connected with the main power supply, and the relay and the main power supply are connected with an external alternating current (AC) power supply unit; and the relay is configured to turn on or turn off the main power supply under the control of the relay switching control unit.

The present disclosure further provides an operating method of a standby control circuit for a playing apparatus, the standby control circuit including a controller and a standby power supply; and the operating method of the standby control circuit includes:

transmitting, by the controller, a power-on signal or a standby signal, so as to enable the playing apparatus to enter into a power-on state or a standby state;

supplying power to a micro control unit of the playing apparatus by the standby power supply, under the condition that the playing apparatus is in the power-on state; and stopping supplying power to the micro control unit by the standby power supply, under the condition that the playing apparatus is in the standby state.

Optionally, the operating method of the standby control circuit further includes:

supplying power to the standby power supply by the controller, under the condition that the playing apparatus is in the power-on state; and stopping supplying power to the standby power supply by the controller, under the condition that the playing apparatus is in the standby state.

Optionally, the step of supplying power to the standby power supply by the controller under the condition that the playing apparatus is in the power-on state includes:

under the condition that the playing apparatus is in the power-on state, supplying power to the standby power supply by wireless transmission by the controller.

Optionally, the controller includes a first wireless power supplying unit, and the standby power supply includes a first wireless power receiving unit; and the step of supplying power to the standby power supply by wireless transmission by the controller under the condition that the playing apparatus is in the power-on state includes:

under the condition that the playing apparatus is in the power-on state, supplying power to the first wireless power receiving unit by wireless transmission by the first wireless power supplying unit.

Optionally, the controller further includes a second wireless power receiving unit and a rechargeable battery; and the operating method of the standby control circuit further includes:

receiving, by the second wireless power receiving unit, electric energy supplied by an external second wireless power supplying unit; and storing, by the rechargeable battery, the electric energy received by the second wireless power receiving unit.

DETAILED DESCRIPTION OF THE EMBODIMENTS

To make those skilled in the art better understand the technical solutions of the present disclosure, the standby control circuit and the operating method thereof, and the playing apparatus provided by the present disclosure will be described in detail below in conjunction with the accompanying drawings.

First Embodiment

The present embodiment provides a standby control circuit for a playing apparatus, and the standby control circuit includes a controller and a standby power supply; the controller is configured to transmit a power-on signal so as to enable the playing apparatus to enter into a power-on state; the controller is further configured to transmit a standby signal so as to enable the playing apparatus to enter into a standby state; and the standby power supply is configured to supply power to a micro control unit under the condition that the playing apparatus is in the power-on state and stop supplying power to the micro control unit under the condition that the playing apparatus is in the standby state, so that power consumption of the standby power supply in the standby state is zero, thus avoiding unnecessary waste of energy and improving energy efficiency.

Figure 1:
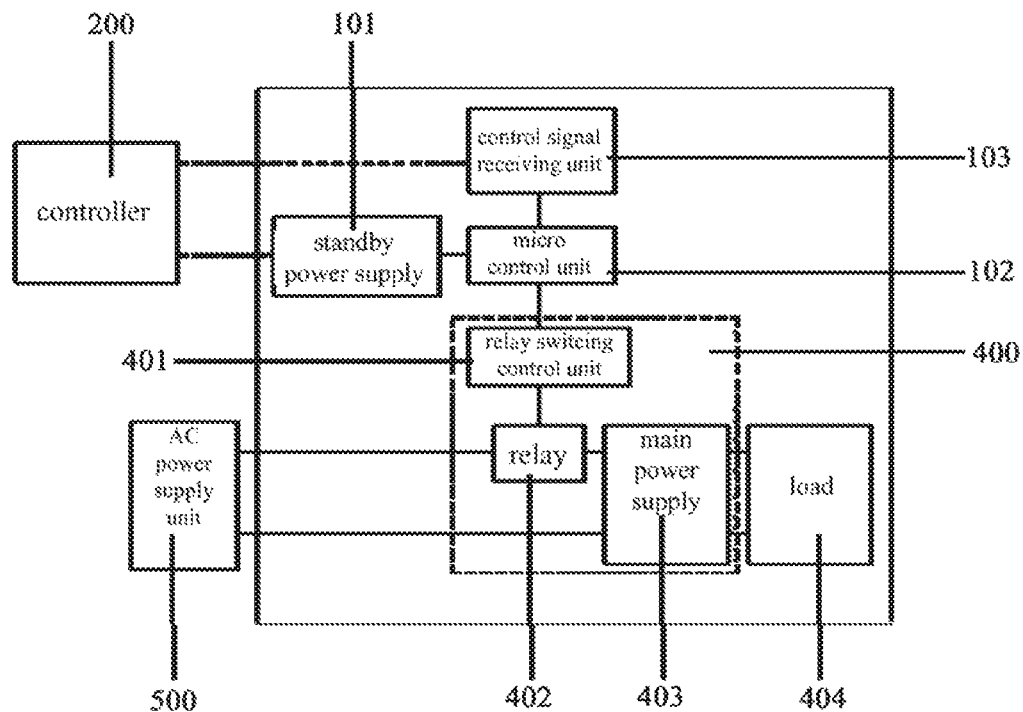
FIG. 1 is a structural schematic diagram of a standby control circuit provided by a first embodiment of the present disclosure.

FIG. 1 is a structural schematic diagram of a standby control circuit provided by a first embodiment of the present disclosure. As illustrated in FIG. 1, the controller 200 supplies power to the standby power supply 101 under the condition that the playing apparatus is in the power-on state, and stops supplying power to the standby power supply 101 under the condition that the playing apparatus is in the standby state. Optionally, the controller 200 supplies power to the standby power supply 101 by wireless transmission under the condition that the playing apparatus is in the power-on state.

Figure 2:
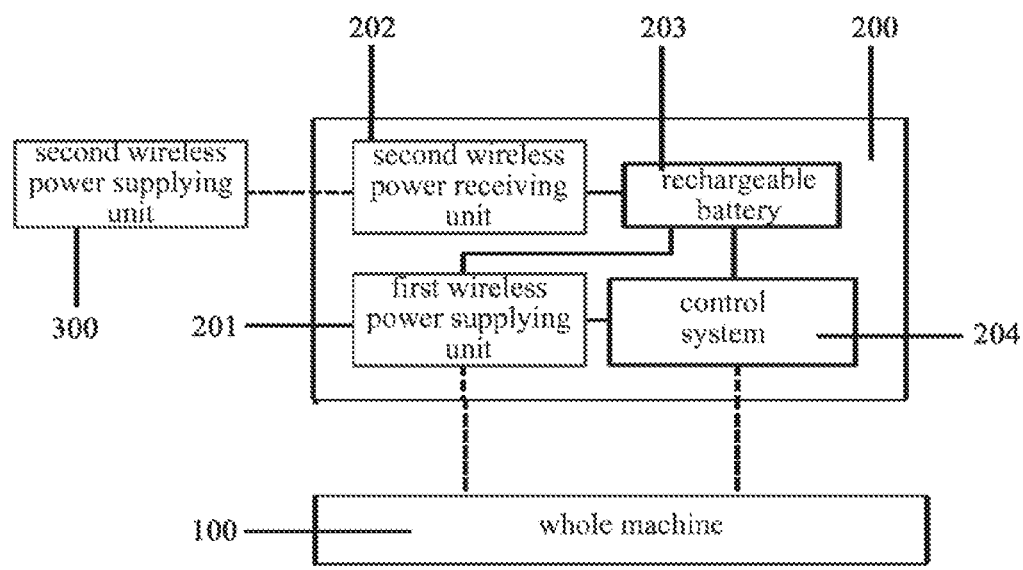
FIG. 2 is a structural schematic diagram of a controller shown in FIG. 1.

FIG. 2 is a structural schematic diagram of the controller shown in FIG. 1. As illustrated in FIG. 2, the controller 200 includes a first wireless power supplying unit 201, and the standby power supply 101 includes a first wireless power receiving unit. The first wireless power supplying unit 201 is configured to supply power to the first wireless power receiving unit by wireless transmission under the condition that the playing apparatus is in the power-on state. Optionally, the controller 200 further includes a second wireless power receiving unit 202 and a rechargeable battery 203; the second wireless power receiving unit 202 is configured to receive electric energy supplied by an external second wireless power supplying unit 300, and the rechargeable battery 203 is configured to store the electric energy received by the second wireless power receiving unit 202. The controller 200 further includes a control system 204, which is configured to control the first wireless power supplying unit 201 to supply power to the standby power supply 101 and output a whole-machine control signal to control the whole machine of the playing apparatus.

The standby control circuit provided in the present embodiment includes a controller and a standby power supply, the controller is configured to transmit a power-on signal so as to enable the playing apparatus to enter into a power-on state, the controller is further configured to transmit a standby signal so as to enable the playing apparatus to enter into a standby state, and the standby power supply is configured to supply power to a micro control unit of the playing apparatus under the condition that the playing apparatus is in the power-on state and stop supplying power to the micro control unit of the playing apparatus under the condition that the playing apparatus is in the standby state. Therefore, in the standby state, power consumption of the standby power supply provided in the present embodiment is zero, thus avoiding unnecessary waste of energy and improving energy efficiency.

Second Embodiment

The present disclosure provides a playing apparatus, which includes a micro control unit and the standby control circuit provided in the first embodiment, details about the standby control circuit may refer to the description in the first embodiment and are not repeated herein.

Referring to FIG. 1, the micro control unit 102 is connected to the standby power supply 101, and the micro control unit 102 is configured to control the playing apparatus according to a control signal transmitted by the controller 200. Optionally, the playing apparatus further includes a main power supply circuit 400, which is connected to the micro control unit 102, and configured to turn on or turn off a main power supply 403 under the control of the micro control unit 102. Optionally, the main power supply circuit 400 includes a relay switching control unit 401, a relay 402 and the main power supply 403, the relay switching control unit 401 is connected with the micro control unit 102 and the relay 402, respectively, the relay 402 is connected with the main power supply 403, the relay 402 and the main power supply 403 are connected with an external AC power supply unit 500, the relay 402 is configured to turn on or turn off the main power supply 403 under the control of the relay switching control unit 401, and the main power supply 403 is configured to supply power to a load 404.

In the present embodiment, the playing apparatus may be a TV set system, the controller 200 may be a remote controller, and the whole machine 100 may be a TV set. The controller 200 transmits, to the whole machine 100, two different control signals, one of which is a whole-machine control signal, and the other of which is a wireless power supplying signal. A control signal receiving unit 103 of the whole machine 100 is configured to receive the whole-machine control signal. The control signal receiving unit 103 is connected to the micro control unit 102. The remote controller 200 starts to supply power wirelessly to the standby power supply 101 while transmitting the power-on signal "Power On", and at this time, the micro control unit 102 can operate to control, through the relay switching control unit 401, the relay 402 to turn on the main power supply 403, such that the TV set starts to operate normally.

When the controller 200 outputs the standby signal "Power OFF" to the whole machine, the controller 200 stops supplying power to the micro control unit 102. At this time, the micro control unit 102 stops operating, and the relay switching control unit 401, the relay 402 and the main power supply 403 also stop operating. Therefore, power consumption of the TV set system in the standby state is zero, thus avoiding unnecessary waste of energy and improving energy efficiency.

The standby power supply provided in the present embodiment is disposed in the playing apparatus, connected with the micro control unit of the playing apparatus, and configured to supply power to the micro control unit under the condition that the playing apparatus is in the power-on state and stop supplying power to the micro control unit under the condition that the playing apparatus is in the standby state. Therefore, in the standby state, power consumption of the standby power supply provided in the present embodiment is zero, thus avoiding unnecessary waste of energy and improving energy efficiency.

In the playing apparatus provided in the present embodiment, the standby control circuit includes a controller and a standby power supply, the controller is configured to transmit a power-on signal so as to enable the playing apparatus to enter into the power-on state, the controller is further configured to transmit a standby signal so as to enable the playing apparatus to enter into a standby state, and the standby power supply is configured to supply power to the micro control unit of the playing apparatus under the condition that the playing apparatus is in the power-on state and stop supplying power to the micro control unit of the playing apparatus under the condition that the playing apparatus is in the standby state. Therefore, in the standby state, power consumption of the standby power supply provided in the present embodiment is zero, thus avoiding unnecessary waste of energy and improving energy efficiency.

Third Embodiment

Figure 3:
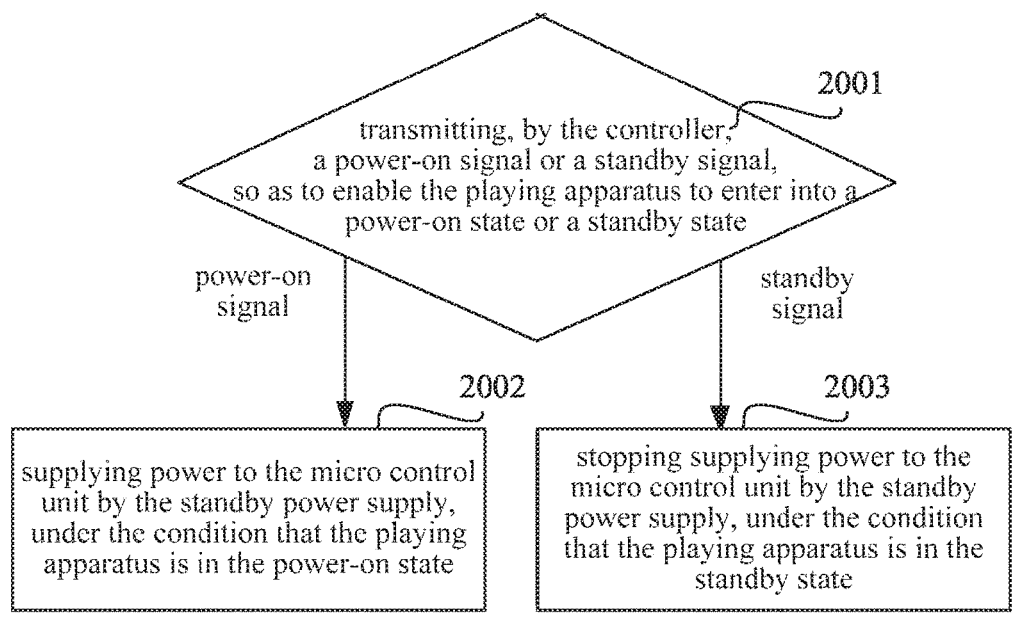
FIG. 3 is a flow chart of an operating method of a standby control circuit provided by a third embodiment of the present disclosure.

FIG. 3 is a flow chart of an operating method of a standby control circuit provided by a third embodiment of the present disclosure. As illustrated in FIG. 3, the standby control circuit includes a controller and a standby power supply, and the operating method of the standby control circuit includes:

Step 2001: transmitting, by the controller, a power-on signal or a standby signal, so as to enable the playing apparatus to enter into a power-on state or a standby state;

Step 2002: supplying power to a micro control unit of the playing apparatus by the standby power supply, under the condition that the playing apparatus is in the power-on state; and Step 2003: stopping supplying power to the micro control unit by the standby power supply, under the condition that the playing apparatus is in the standby state.

In the present embodiment, the operating method of the standby control circuit further includes: supplying power to the standby power supply by the controller, under the condition that the playing apparatus is in the power-on state; and stopping supplying power supply to the standby power supply by the controller, under the condition that the playing apparatus is in the standby state. In the present embodiment, the step of supplying power to the standby power supply by the controller, under the condition that the playing apparatus is in the power-on state includes: under the condition that the playing apparatus is in the power-on state, supplying power to the standby power supply by wireless transmission by the controller. Optionally, the controller includes a first wireless power supplying unit, and the standby power supply includes a first wireless power receiving unit. The step of supplying power to the standby power supply by wireless transmission by the controller under the condition that the playing apparatus is in the power-on state includes: under the condition that the playing apparatus is in the power-on state, supplying power to the first wireless power receiving unit by wireless transmission by the first wireless power supplying unit. Optionally, the controller further includes a second wireless power receiving unit and a rechargeable battery. The operating method of the standby control circuit further includes: receiving, by the second wireless power receiving unit, electric energy supplied by an external second wireless power supplying unit; and storing, by the rechargeable battery, the electric energy received by the second wireless power receiving unit.

Referring to FIG. 1, the controller 200 supplies power to the standby power supply 101 under the condition that the playing apparatus is in the power-on state, and stops supplying power to the standby power supply 101 under the condition that the playing apparatus is in the standby state. Optionally, the controller 200 supplies power to the standby power supply 101 by wireless transmission under the condition that the playing apparatus is in the power-on state.

Referring to FIG. 2, the controller 200 includes the first wireless power supplying unit 201, and the standby power supply 101 includes the first wireless power receiving unit. The first wireless power supplying unit 201 is configured to supply power to the first wireless power receiving unit 201 by wireless transmission under the condition that the playing apparatus is in the power-on state. Optionally, the controller 200 further includes the second wireless power receiving unit 202 and the rechargeable battery 203; the second wireless power receiving unit 202 is configured to receive electric energy supplied by the external second wireless power supplying unit 300, and the rechargeable battery 203 is configured to store the electric energy received by the second wireless power receiving unit 202. The controller 200 further includes the control system 204, which is configured to control the first wireless power supplying unit 201 to supply power to the standby power supply 101 and output a whole-machine control signal to control the whole machine of the playing apparatus.

In the operating method of a standby control circuit provided in the present embodiment, the standby control circuit includes a controller and a standby power supply, the controller is configured to transmit a power-on signal so as to enable the playing apparatus to enter into a power-on state, the controller is further configured to transmit a standby signal so as to enable the playing apparatus to enter into a standby state, and the standby power supply is configured to supply power to a micro control unit of the playing apparatus under the condition that the playing apparatus is in the power-on state and stop supplying power to the micro control unit of the playing apparatus under the condition that the playing apparatus is in the standby state. Therefore, in the standby state, power consumption of the standby power supply provided in the present embodiment is zero, thus avoiding unnecessary waste of energy and improving energy efficiency.

It can be understood that the foregoing embodiments are merely exemplary embodiments used for describing the principle of the present disclosure, but the present disclosure is not limited thereto. Those of ordinary skill in the art may make various variations and improvements without departing from the spirit and essence of the present disclosure, and these variations and improvements shall fall into the protection scope of the present disclosure.

What is claimed is:

1. A playing apparatus, comprising a micro control unit, a controller receiving external electric energy, a standby power supply, the micro control unit connected to the standby power supply, and a main power supply circuit connected with an external alternating current power supply unit, wherein
   the controller is configured to transmit a power-on signal and a standby signal;
   the main power supply circuit is further connected to the micro control unit,
   the micro control unit is configured to control the playing apparatus to enter into a power-on state according to the power-on signal transmuted by the controller, and to control the playing apparatus to enter into a standby state according to the standby signal transmitted by the controller;
   the main power supply circuit is configured to turn on or turn off a main power supply for supplying power to the playing apparatus, under the control of the micro control unit, so as to enable the playing apparatus to footer into the power-on state or the standby state,
   the controller is further configured to stop supplying power to the standby power supply under the condition that the playing apparatus is in the standby state;
   the standby power supply and the micro control unit are connected between the controller and the main power supply circuit and are not connected with the external alternating current power supply unit, the standby power supply is configured to supply power to the micro control unit of the playing apparatus under the condition that the playing apparatus is in the power-on state and stop supplying power to the micro control unit of the playing apparatus under the condition that the playing apparatus is in the standby state,
   wherein the controller comprises a first wireless power supplying unit, and the standby power supply comprises a first wireless power receiving unit; and
   the first wireless power supplying unit is configured to supply power to the first wireless power receiving unit by wireless transmission under the condition that the playing apparatus is in the power-on state.

2. The playing apparatus according to claim 1, wherein the main power supply circuit comprises a relay switching control unit, a relay and the main power supply, the relay switching control unit is connected with the micro control unit and the relay, respectively, the relay is connected with the main power supply, and the relay and the main power supply are connected with the external alternating current power supply unit; and
   the relay is configured to turn on or turn off the main power supply under the control of the relay switching control unit.

3. The playing apparatus according to claim 1, wherein the controller further comprises a second wireless power receiving unit and a rechargeable battery;
   the second wireless power receiving unit is configured to receive electric energy supplied by an external second wireless power supplying unit; and
   the rechargeable battery is configured to store the electric energy received by the second wireless power receiving unit.

4. An operating method of a standby control circuit for a playing apparatus, wherein the playing apparatus comprises a micro control unit, a controller receiving external electric energy, a standby power supply, the micro control unit connected to the standby power supply, and a main power supply circuit connected with an external alternating current power supply unit, wherein the standby power supply and the micro control unit are connected between the controller and the main power supply circuit and are not connected with the external alternating current power supply unit, and the controller comprises a first wireless power supplying unit, and the standby power supply comprises a first wireless power receiving unit, wherein
   the operating method of the standby control circuit comprises:
   transmitting, by the controller, a power-on signal or a standby signal;
   controlling, by the micro control unit, the playing apparatus to enter into a power-on state according to the power-on signal transmitted by the controller, and to enter into a standby state according to the standby signal transmitted by the controller;
   turning on or turning off, by the main power supply circuit, a main power supply for supplying power to the playing apparatus, under the control of the micro control unit, so as to enable the playing apparatus to enter into the power-on state or the standby state,
   stopping, by the controller, supplying newer to the standby power supply under the condition drat the playing apparatus is in the standby state;
   supplying power be the standby power supply, to the micro control unit of the playing apparatus under the condition that the playing apparatus is in the power-on state and stopping supplying power to the micro control unit, of the playing apparatus under the condition drat the playing apparatus is in the standby state,
   under the condition that the playing apparatus is in the power-on state, the first wireless power supplying unit supplies power to the first wireless power receiving unit by wireless transmission, and
   under the condition that the playing apparatus is in the standby state, the controller stops supplying power to the standby power supply.

5. The operating method of a standby control circuit according to claim 4, wherein the controller further comprises a second wireless power receiving unit and a rechargeable battery; and
   the operating method of the standby control circuit further comprises:
   receiving, by the second wireless power receiving unit, electric energy supplied by an external second wireless power supplying unit; and
   storing, by the rechargeable battery, the electric energy received by the second wireless power receiving unit.

* * * * *